US008744864B2

(12) United States Patent
Bacon et al.

(10) Patent No.: US 8,744,864 B2
(45) Date of Patent: Jun. 3, 2014

(54) METHODS AND SYSTEMS FOR GENERATING A FINANCIAL REPORT

(75) Inventors: Douglas Carl Bacon, Marietta, GA (US); David Anthony Faour, Chattanooga, TN (US); Thomas Aloysius Ruddy, Marietta, GA (US); Jeffrey Scott Hamilton, Acworth, GA (US); Mark Kurt Wilhelm Scherluebbe, Marietta, GA (US); Leigh-Ann Darden Heuser, Marietta, GA (US)

(73) Assignee: General Electric Company, Schenectady, NY (US)

( * ) Notice: Subject to any disclaimer, the term of this patent is extended or adjusted under 35 U.S.C. 154(b) by 1998 days.

(21) Appl. No.: 10/629,295

(22) Filed: Jul. 29, 2003

(65) Prior Publication Data

US 2005/0027586 A1 Feb. 3, 2005

(51) Int. Cl.
*G06Q 10/00* (2012.01)
(52) U.S. Cl.
USPC .......................................................... 705/1.1
(58) Field of Classification Search
USPC ............................................................. 705/1
See application file for complete search history.

(56) References Cited

U.S. PATENT DOCUMENTS

| | | | |
|---|---|---|---|
| 5,027,268 A | 6/1991 | Sakurai et al. | |
| 5,210,704 A | 5/1993 | Husseiny | |
| 5,225,873 A | 7/1993 | Lux et al. | |
| 5,608,845 A | 3/1997 | Ohtsuka et al. | |
| 5,648,919 A | 7/1997 | Yamauchi et al. | |
| 6,490,543 B1 | 12/2002 | Jaw | |
| 2001/0014868 A1* | 8/2001 | Herz et al. ...................... | 705/14 |
| 2001/0032109 A1* | 10/2001 | Gonyea et al. .................... | 705/8 |
| 2001/0054022 A1* | 12/2001 | Louie et al. ..................... | 705/38 |
| 2002/0016655 A1* | 2/2002 | Joao ................................. | 701/35 |
| 2002/0059269 A1* | 5/2002 | McQuown et al. ........... | 707/100 |
| 2002/0161533 A1* | 10/2002 | Uegaki ............................ | 702/35 |
| 2003/0084019 A1* | 5/2003 | Woodmansee ................... | 707/1 |
| 2003/0097288 A1* | 5/2003 | Shimomura et al. .............. | 705/8 |

FOREIGN PATENT DOCUMENTS

JP 2002149861 A * 5/2002

* cited by examiner

*Primary Examiner* — Tonya Joseph
(74) *Attorney, Agent, or Firm* — Armstrong Teasdale LLP

(57) ABSTRACT

A method for generating a financial report indicative of estimated turbine maintenance costs is provided. The method includes receiving, at a database, turbine operational history data and turbine inspection data from a user for a pre-identified turbine, receiving, at the database, turbine replacement part costs, turbine part repair costs, and vendor service costs associated with the pre-identified turbine, inputting a pre-determined turbine operational forecast into the database, analyzing turbine maintenance information including at least one of turbine operational history data, turbine inspection data, replacement part costs, part repair costs, vendor service costs, and turbine operational forecast, and automatically generating a financial report including at least one schedule of turbine maintenance events and costs associated with each event based on the turbine maintenance information analysis.

18 Claims, 6 Drawing Sheets

US 8,744,864 B2

METHODS AND SYSTEMS FOR GENERATING A FINANCIAL REPORT

BACKGROUND OF THE INVENTION

This invention relates generally to analyzing power plant event schedules, more particularly, to generating a financial report indicative of turbine maintenance event schedules by a business entity for a client.

Power plants utilizing gas turbines and steam turbines have become increasingly more complex thereby utilizing an increased quantity of various components. The power plant is periodically shut down to allow scheduled turbine maintenance events, facilitating maintenance and repair of the installed components, and to replace components which have reached the end of their useful life.

At least one known method utilizes a complex algorithm to determine the current operating condition of the power plant and the current hours on each part within the power plant. Utilizing a complex algorithm can be time consuming and costly since the algorithm generally relies on user information that is manually calculated to generate a schedule of parts replacement. If the manual calculations are incorrect, a part at or near the end of its life cycle may not be replaced during the shutdown resulting in an unanticipated plant shutdown in the future. Additionally, at least one known method utilizes a condition-based prediction of outages. The condition-based prediction requires an operator to inspect each part and manually enter the data into the algorithm. Manually entering data into the algorithm is time consuming and increases a likelihood that the algorithm with generate erroneous results.

BRIEF DESCRIPTION OF THE INVENTION

In one aspect, a method for generating a financial report indicative of estimated turbine maintenance costs is provided. The method includes receiving, at a database, turbine operational history data and turbine inspection data from a user for a pre-identified turbine, receiving, at the database, turbine replacement part costs, turbine part repair costs, and vendor service costs associated with the pre-identified turbine, inputting a pre-determined turbine operational forecast into the database, analyzing turbine maintenance information including at least one of turbine operational history data, turbine inspection data, replacement part costs, part repair costs, vendor service costs, and turbine operational forecast, and automatically generating a financial report including at least one schedule of turbine maintenance events and costs associated with each event based on the turbine maintenance information analysis.

In another aspect, a network based system for maintaining at least one component is provided. The system includes a client system, a centralized database for storing information, a server system configured to be coupled to said client system and said database wherein the server system is further configured to receive, at a database, component operational history data and component inspection data from a user for a pre-identified component, receive, at the database, component replacement part costs, component part repair costs, and vendor service costs associated with the pre-identified component, prompt a user to input a pre-determined component operational forecast into the database, analyze component maintenance information including at least one of component operational history data, component inspection data, replacement part costs, part repair costs, vendor service costs, and component operational forecast, and automatically generate a financial report including at least one schedule of component maintenance events and costs associated with each event based on the component maintenance information analysis.

In still another aspect, a computer program embodied on a computer readable medium for maintaining at least one component is provided. The program includes a code segment that receives, at a database, component operational history data and component inspection data from a user for a pre-identified component and then receives, at the database, component replacement part costs, component part repair costs, and vendor service costs associated with the pre-identified component, prompts a user to input a pre-determined component operational forecast into the database, analyzes component maintenance information including at least one of component operational history data, component inspection data, replacement part costs, part repair costs, vendor service costs, and component operational forecast, and automatically generates a financial report including at least one schedule of component maintenance events and costs associated with each event based on the component maintenance information analysis.

DETAILED DESCRIPTION OF THE INVENTION

Figure 1:
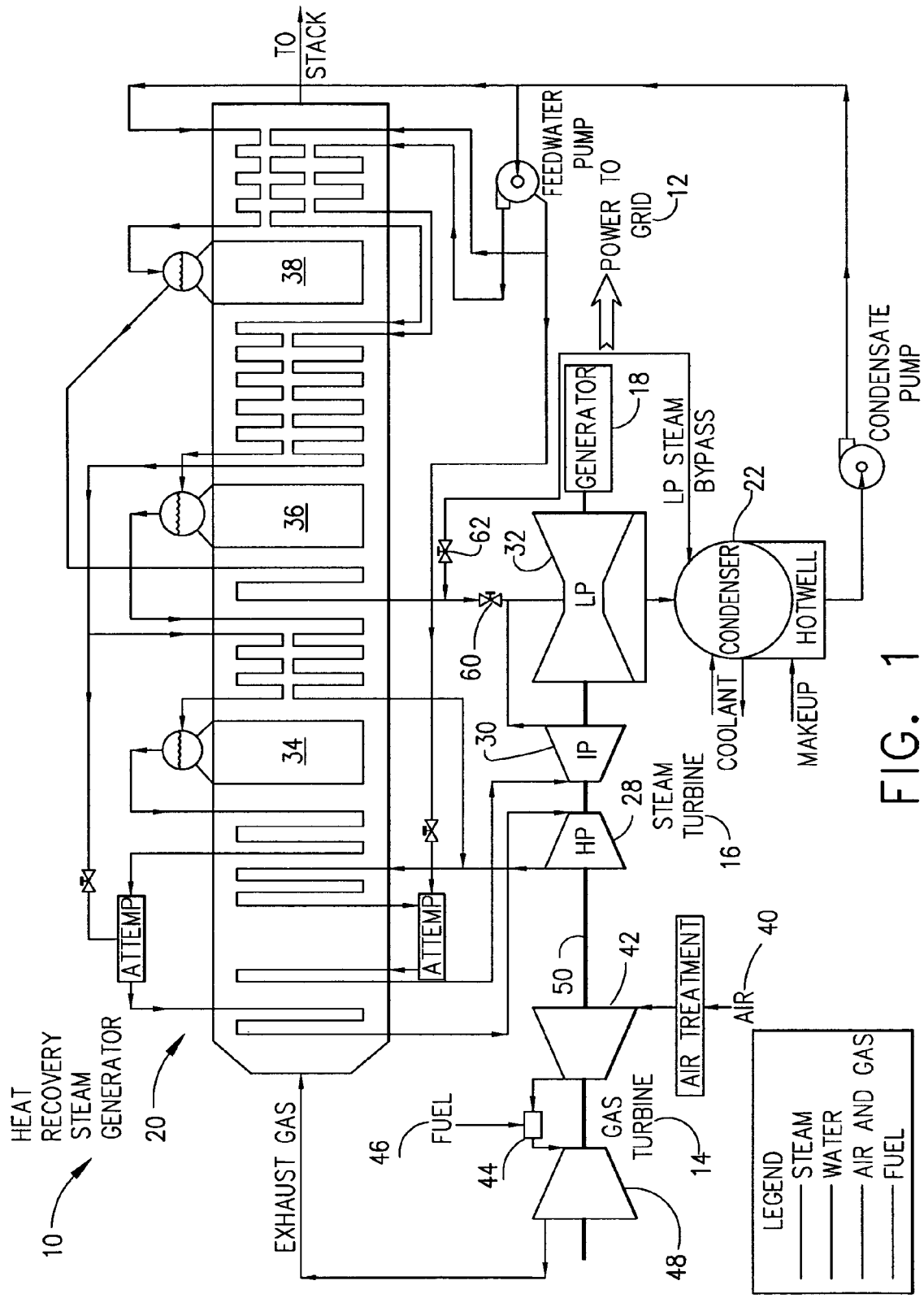
FIG. 1 is a schematic illustration of an exemplary power plant configured to supply energy to a power grid or another shaft power consumer.

FIG. 1 is a schematic illustration of an exemplary power plant 10 configured to supply energy to a power grid 12. In an exemplary embodiment, and referring to FIG. 1, power plant 10 is a multi-pressure, single-shaft combined cycle power plant 10 and includes a gas turbine 14 mechanically coupled to a steam turbine 16, and a common generator 18 via a shaft 50. Power plant 10 also includes a heat recovery steam generator (HRSG) 20, a condenser 22, and a plurality of pumps (not shown) for repressurizing the condensate for supply to HRSG 20. In the exemplary embodiment, steam turbine 16 includes a High Pressure (HP) section 28, an Intermediate Pressure (IP) section 30, and a Low Pressure (LP) section 32. HRSG 20 includes a high pressure section 34, an intermediate pressure section 36, and a low pressure section 38.

In another exemplary embodiment power plant 10 is a multi-pressure, multi-shaft combined cycle power plant 10 wherein gas turbine 14 is mechanically coupled to generator 18 via shaft 50, and steam turbine 16 is mechanically coupled to a separate generator 19 via shaft 51. Power plant 10 is otherwise of the same configuration as shown FIG. 1.

Figure 2:
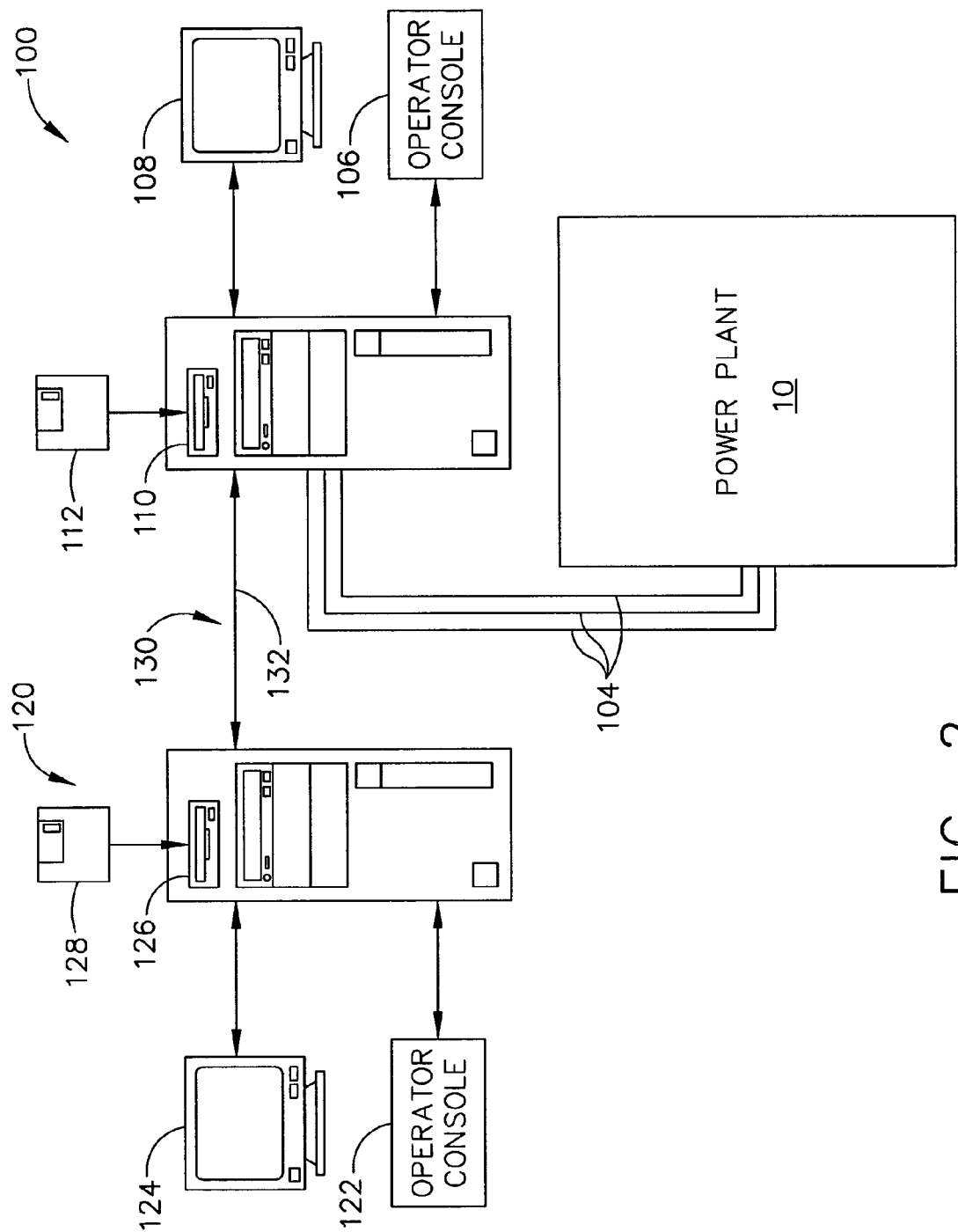
FIG. 2 illustrates a computer system that can be used with the power plant shown in FIG. 1.

In use, ambient air 40 is channeled into a turbine compressor section 42 and compressed. Compressed air is then directed into a combustion section 44 and mixed with fuel 46. The mixture is ignited and the combustion gases are channeled to rotate a turbine section 48. In FIG. 1, shaft 50 transmits the torque produced by gas turbine 14 and steam turbine 16 to either generator 18 to produce electricity, or to another power consuming load (not shown). In FIG. 2, shaft 50 transmits the torque produced by gas turbine 14 to either generator 18 to produce electricity, or to another power consuming load (not shown). Shaft 51 also transmits the torque produced by steam turbine 16 to either generator 19 to produce electricity, or to another power consuming load (not shown).

Exhaust heat from gas turbine 14 is introduced into HRSG 20 via an exhaust duct 52, wherein the exhaust heat is used to convert water supplied from steam turbine condenser 22 into steam for re-admission into steam turbine 16. Specifically, water from condenser 22 is supplied to each multiple pressure level (three in FIGS. 1 & 2). Steam generated in a high pressure section 34 (also called the main steam) is introduced into an inlet or throttle section of steam turbine HP section 28. The temperature and pressure of the steam decreases as it expands through HP section 28 until being directed to the cold reheat piping. The cold reheat piping channels the steam to HRSG 20 wherein additional heat is added using a reheater. This higher energy steam produced, called hot reheat steam, is directed into an inlet of steam turbine IP section 30. Steam temperature and pressure decrease as the steam expands through IP section 30 and is channeled into steam turbine LP section 32. In one embodiment, steam from HRSG low pressure section 38, also called admission steam, is supplied to LP section 32 via admission valve 60. Plant 10 also includes a plurality of bypass piping configured to bypass steam generated in HRSG sections 34, 36, and 38 to condenser 22 during startup conditions, and until steam conditions are suitable for steam turbine admission. Only the LP bypass, via valve 62, is shown in FIGS. 1 and 2. Many variations of multi-pressure combined cycle power systems exist, including, but not limited to, the three pressure reheat systems shown in FIGS. 1 and 2, as well as three pressure non-reheat, two pressure reheat, and two pressure non-reheat cycles, with numerous variations on equipment design and arrangement. The methods described herein are applicable to all of the aforementioned embodiments, provided LP steam can either be admitted to LP turbine 32, as through admission valve 60 (shown in FIGS. 1 and 2), or bypassed such that steam does not enter LP steam turbine 32, as through LP steam bypass valve 62 (shown in FIGS. 1 and 2). After the steam has passed through LP section 32, the steam exhausts to condenser 22 to be condensed to water. The water is pumped back to HRSG 20 to restart the steam generation cycle again.

FIG. 2 illustrates a computer system 100 that can be used with a power plant such as, but not limited to, power plant 10 (shown in FIG. 1). Computer system 100 includes a plurality of sensors 104 electrically coupled to power plant 10 including, but not limited to, gas turbine 14 and steam turbine 16. Computer system 100 receives sampled and digitized sensor data from at least one of sensors 104 and performs high-speed data analysis. Additionally, computer 100 receives commands from an operator via a keyboard 106. An associated monitor 108 such as, but not limited to, a liquid crystal display (LCD) and a cathode ray tube, allows the operator to observe data received from computer 100.

In one embodiment, computer 100 includes a device 110, for example, a floppy disk drive, CD-ROM drive, DVD drive, magnetic optical disk (MOD) device, or any other digital device including a network connecting device such as an Ethernet device for reading instructions and/or data from a computer-readable medium 112, such as a floppy disk, a CD-ROM, a DVD or an other digital source such as a network or the Internet, as well as yet to be developed digital means. In another embodiment, computer 100 executes instructions stored in firmware (not shown).

In the exemplary embodiment, computer 100 is a client server 100 and is communicatively coupled to a remote server 120 using a network 130. Remote server 120 receives commands from an operator via a keyboard 122. An associated monitor 124 such as, but not limited to, a liquid crystal display (LCD) and a cathode ray tube, allows the operator to observe data received from remote server 120. In one embodiment, remote server 120 includes a device 126, for example, a floppy disk drive, CD-ROM drive, DVD drive, magnetic optical disk (MOD) device, or any other digital device including a network connecting device such as an Ethernet device for reading instructions and/or data from a computer-readable medium 128, such as a floppy disk, a CD-ROM, a DVD or an other digital source such as a network or the Internet, as well as yet to be developed digital means. In another embodiment, remote server 120 executes instructions stored in firmware (not shown).

Network 130 includes a broadband segment 132 communicatively coupled to client server 100 and remote server 120. In one exemplary embodiment, broadband segment 132 is a private intranet for communicating gas turbine information between local turbine sites and personnel located at a remote site. In another embodiment, broadband segment 132 is the Internet. In one embodiment, client server 100 monitors turbine operating parameters locally, e.g. collects current turbine operating hours and transmits the operating parameters to remote server 120 via network 130. In another exemplary embodiment, the turbine operating parameters and the inspection history are transmitted by an operator to a remote site, e.g. using a phone line, and manually entered by an operator into remote server 120.

Client server 100 and remote server 120 are programmed to perform functions described herein, and as used herein, the term computer or server are not limited to just those integrated circuits generally known as computers or servers, but broadly refers to computers, processors, microcontrollers, microcomputers, programmable logic controllers, application specific integrated circuits, and other programmable circuits, and these terms are used interchangeably herein. Additionally, although the herein described methods and apparatus are described in an industrial setting, it is contemplated that the benefits of the invention accrue to non-industrial systems such as those systems typically employed in a transportation setting such as, for example, but not limited to, aircraft.

Example embodiments of systems and processes that facilitate generating a financial report indicative of turbine maintenance by a business entity for a client are described below in detail. A technical effect of the systems and processes described herein include at least one of approximating turbine operating condition and turbine life cycle based on hours of operation on the parts, and therefore providing a simplified method of approximating parts life and thus maintenance events.

Figure 3:
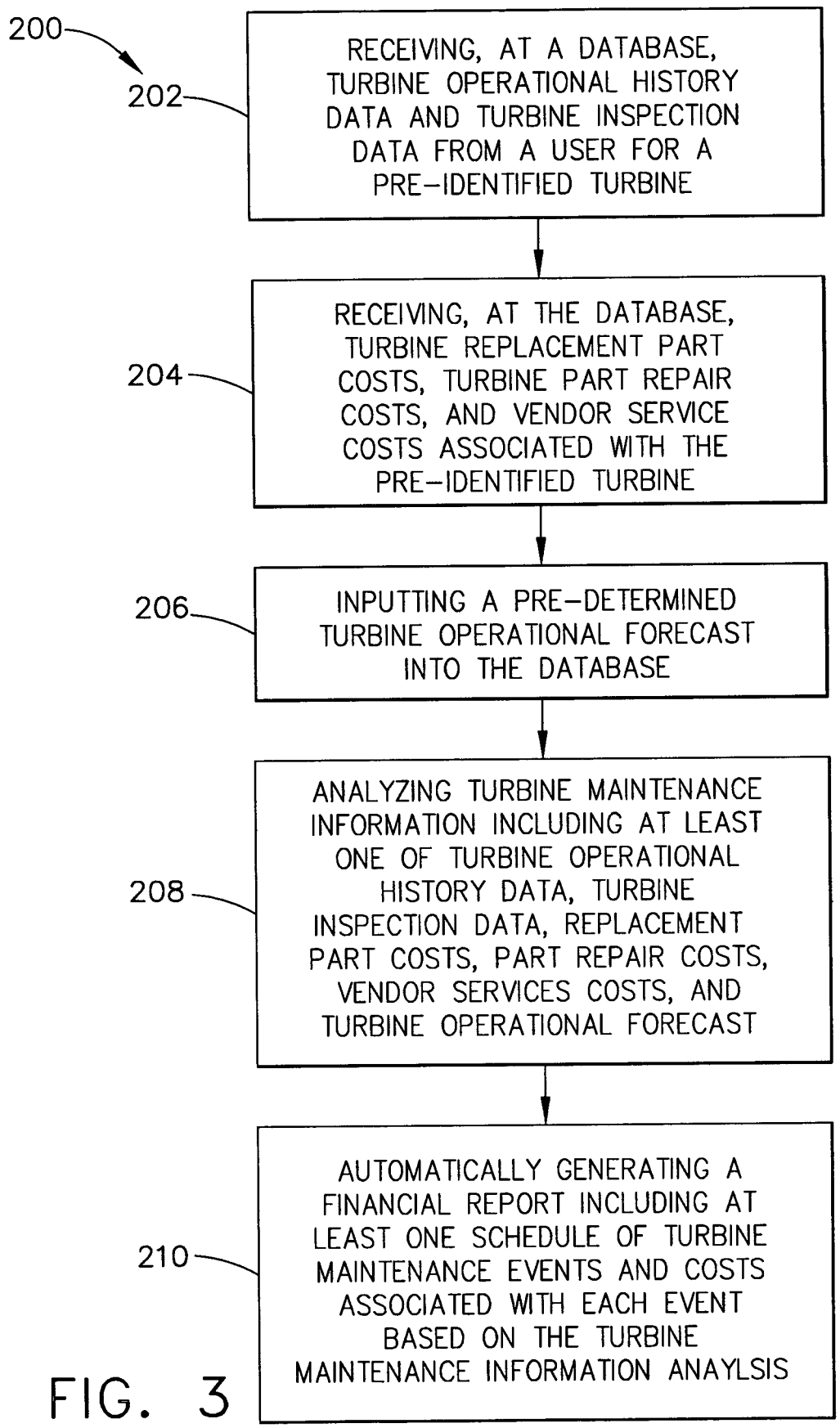
FIG. 3 is a flowchart illustrating example method for generating a financial report.

FIG. 3 is a flow chart illustrating an exemplary method 200 for generating a financial report indicative of turbine maintenance by a business entity for a client. Method 200 includes receiving 202, at a database, 202 turbine operational data and turbine inspection data from the client, receiving 204, at the database, turbine replacement part costs, turbine part repair costs, and vendor service costs associated with the pre-identified turbine, inputting 206 a pre-determined turbine operational forecast into the database, analyzing 208 turbine maintenance information including at least one of turbine operational history data, turbine inspection data, replacement part costs, part repair costs, and vendor service costs, and turbine operational forecast, and automatically generating 210 a financial report based on the turbine maintenance information analysis. Although method 200 can be used with a single plant 10 as described herein, it should be realized that method 200 can also be used to predict maintenance events and financial data for equipment physically located in a plurality of plants simultaneously. Additionally, although method 200 is described as a method to generate a financial report indicative of gas turbine maintenance cost by a business entity for a client, the methods described herein can also be used to generate a financial report indicative of maintenance for a plurality of plant equipment such as, but not limited to steam turbine 16.

Figure 4A:
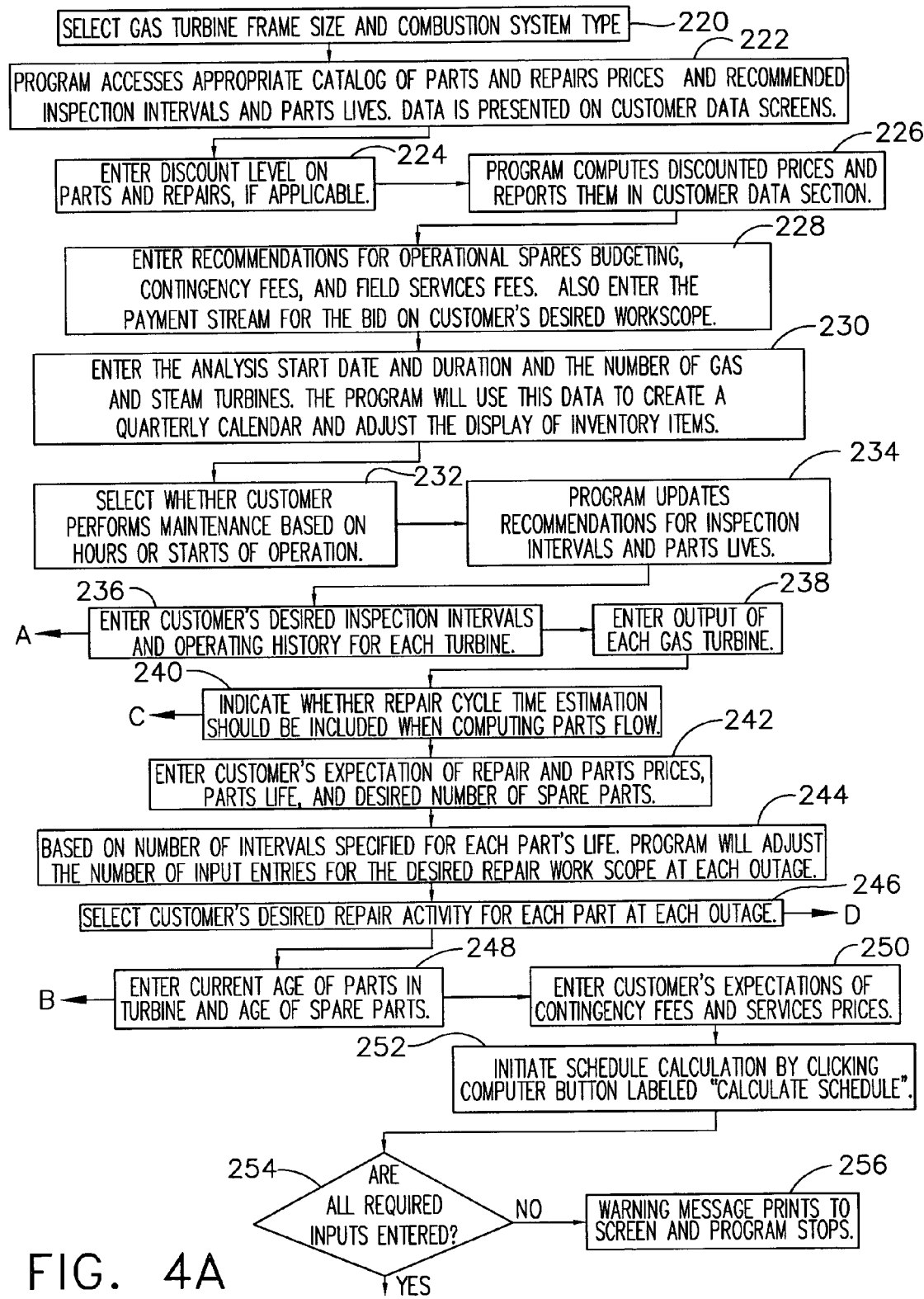
FIGS. 4A, 4B, and 4C are detailed flowcharts illustrating the method shown in FIG. 3.
Figure 4B:
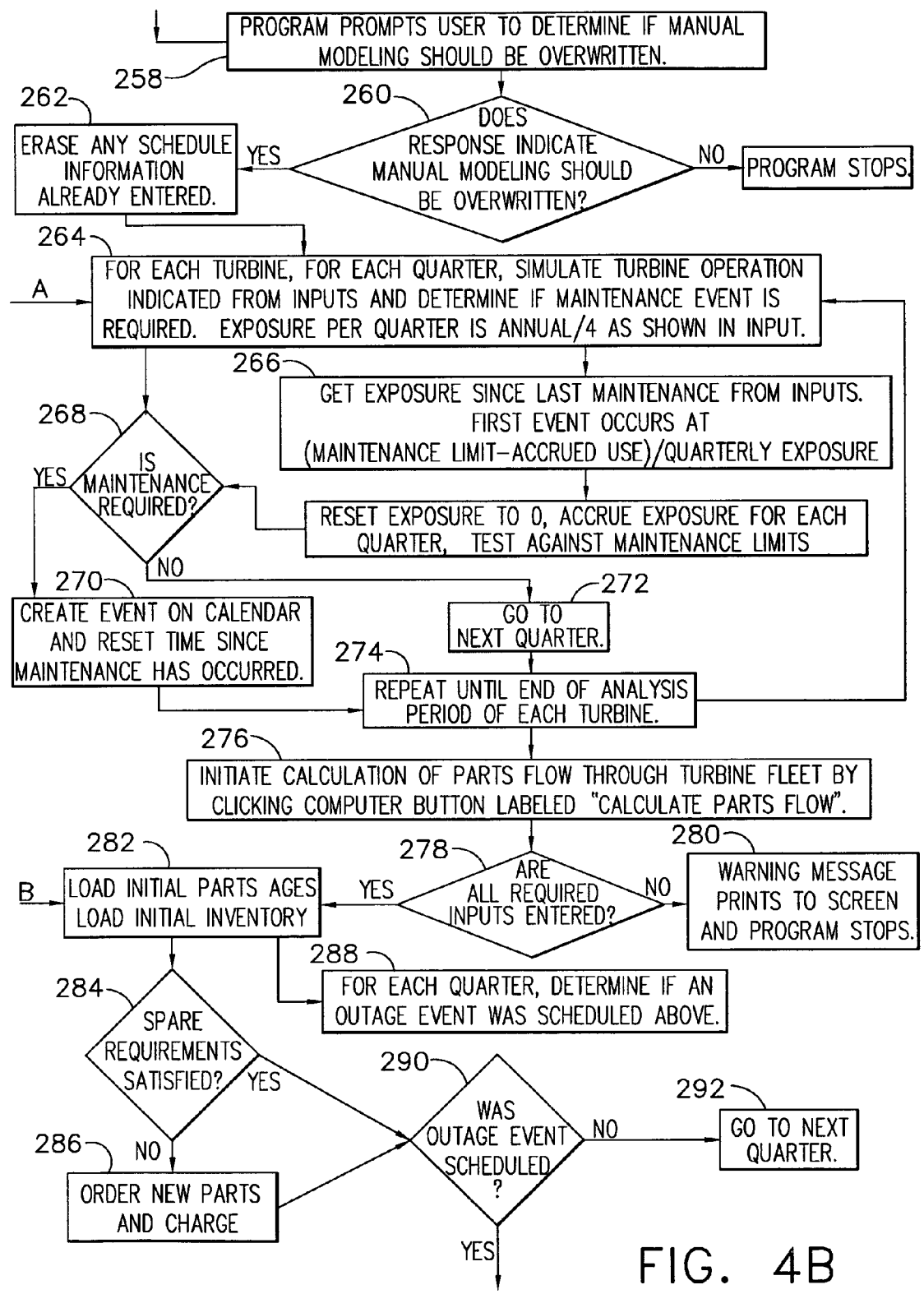
Figure 4C:
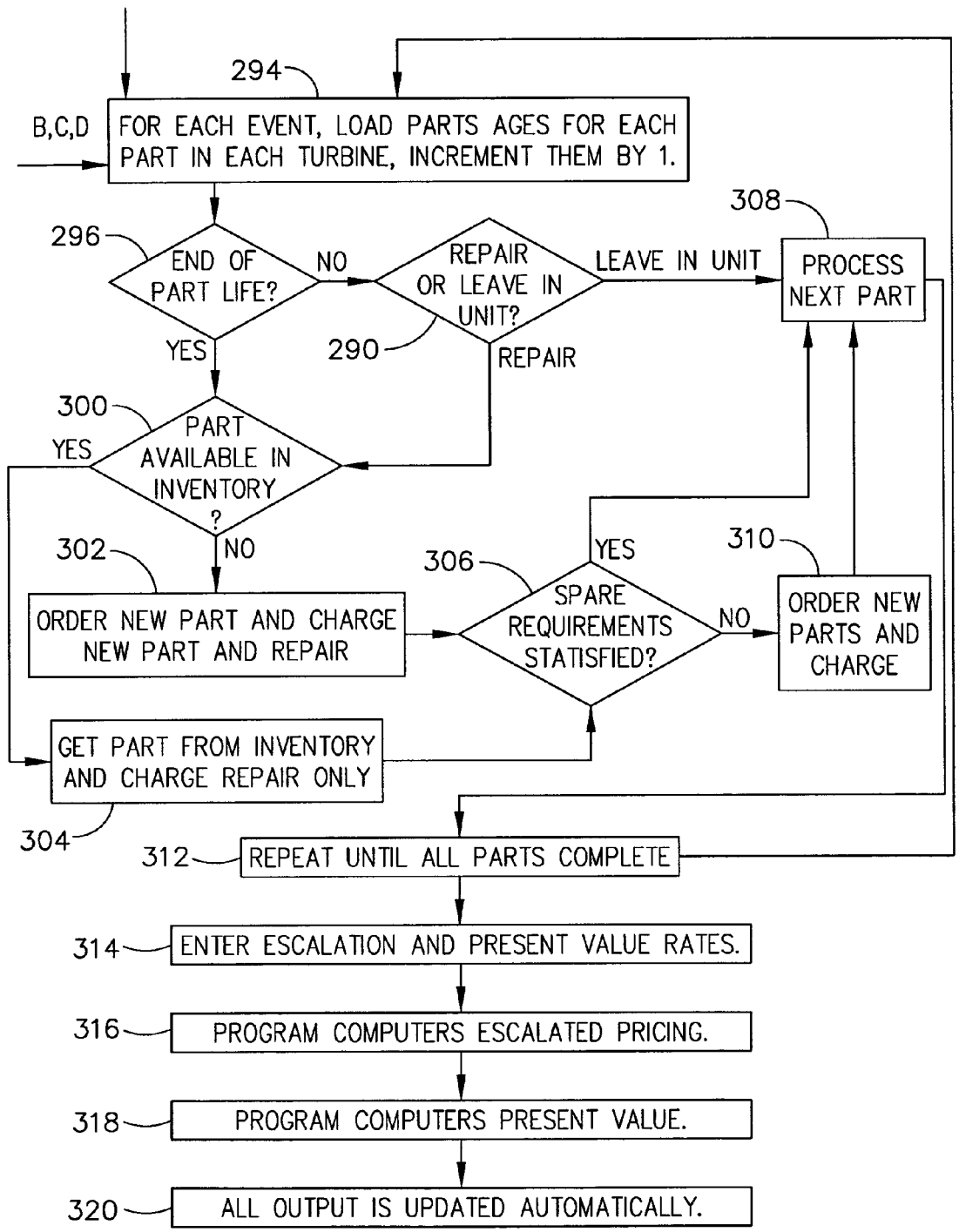

FIGS. 4A, 4B, and 4C are detailed flowcharts illustrating the method shown in FIG. 3. In use, and referring to FIGS. 4A, 4B, and 4C, receiving 202 gas turbine operational data and gas turbine inspection data from the client includes inputting a plurality of data indicative of the gas turbine 14 historical operation prior to the next planned maintenance event or present time, the clients' future operating assumptions, i.e. the quantity of hours the client expects to operate the turbine in the future, cost of new gas turbine parts, cost to repair used gas turbine parts, and an estimate of outage services, i.e. cost of services provided by the business entity for the client. For example, method 200 includes inputting 220 a selected gas turbine frame size and combustion type, accessing 222 a predetermined catalog including new parts' cost and parts' repair prices, and recommending an inspection interval and an estimate of the parts life, i.e. how long the part is expected to function before repair or replacement of the part is required using the algorithm. The algorithm then displays the resulting data on computer 100.

Method 200 also includes entering 224 a discount level on selected gas turbine parts and the cost of repairing selected gas turbine parts, computing 226 at least one discounted price for the selected parts and repairs, and reporting the computed price and repairs in a client data section. The client then enters 228 recommendations indicative of operational spares budgeting, contingency fees, field service fees, i.e. fees charged by the business entity to repair or replace a part in the clients facility, a payment stream for the bid on the client's desired workscope, an analysis start date and duration, and the quantity of gas turbines. Entering the recommendations indicative of operational spares budgeting facilitates determining appreciable costs which are used as part of the estimation. Computer 100 receives the herein described data and creates 230 a quarterly calendar and adjusts the display of parts in inventory and parts in each turbine included in the analysis based on the herein described data. The client then selects 232 whether the maintenance is performed based on turbine operating hours or turbine starts as described previously herein. The algorithm then updates 234 the inspection intervals and parts lives based the client selection.

Method 200 also includes entering 236 the client's desired inspection intervals for turbine 14 and an operational history for each part included in turbine 14. For example, the client inputs the current operational hours of gas turbine 14, and a predetermined quantity of hours or starts gas turbine 14 is expected to operate before the next subsequent inspection for each gas turbine. The client then enters 238 an output for each gas turbine 14. The client also enters 240 data indicative of whether repair cycle time estimation should be included when computing the parts flow. In at least one turbine operating mode, the client opens the turbine, removes at least one part, sends the removed part to the business entity to be repaired and leaves the turbine inoperative until the part is returned to the client. For example, turbines that are operational only in the summer to meet peak demand are examples of this operating mode. Specifically, turbine 16 is opened in the fall and the desired parts are removed and sent to the business entity to be repaired. New and repaired parts are replaced in the spring before turbine 16 is returned to an operational status to meet the clients demands.

The client then enters 242 the client's expectation of repair and parts prices, parts prices, parts life, and desired number of spare parts. For example, the client enters the number of inspection intervals before a part is scrapped, i.e. end of the parts useful service life. The client enters how the part is handled at each of those inspection intervals, typically the part is repaired. The algorithm automatically adjusts 244 the quantity of input entries for the desired repair work scope based on the repair intervals specified for each part as input by the client. The client then enters 246 a desired repair activity for each part at each maintenance event, The client enters 248 a current age of a plurality of parts in turbine 14 and spare turbine parts, and an expectation 250 of contingency fees and service prices. For example, the client enters the age of parts currently installed and operating on gas turbine 14, the age of spare the parts in inventory, such as new or used for at least one inspection interval of operation, and an estimation of repair/service costs the client expects to pay the business entity for repair/replacement of the parts.

The business entity then calculates the outage schedule by depressing a "calculate schedule" icon, for example. The algorithm then notifies the client to confirm that all required inputs have been entered 256. In one embodiment, if all required inputs have not been entered, the algorithm prints an error message and the algorithm ceases execution. In another embodiment, if all required inputs have been entered, the algorithm calculates an inspection schedule for the equipment modeled. The algorithm prompts 258 the user to determine if manual adjustments to the event schedule should be overwritten. If the client inputs a response indicating that the manual adjustments to the event schedule should not be overwritten, the algorithm ceases execution 260. Alternatively, if the client inputs a response indicating the manual adjustments to the event schedule should be overwritten, the algorithm automatically erases 262 any previous schedule information entered by the client and calculates a new maintenance event schedule based on all inputs received.

The algorithm then automatically simulates 264 turbine operation based on received inputs as defined previously herein. For example, for each turbine the algorithm simulates turbine operation based on the previous inputs for a predetermined time such as, but not limited to a quarter, to determine if a maintenance event is required. The algorithm then acquires 266 the exposure per quarter from the last maintenance event based on the received inputs, wherein exposure per quarter is defined as annual/4 based on the clients inputs. The first event then occurs at:

(Maintenance Limit−Accrued Use)/Quarterly exposure.

The exposure is then reset to "0", the exposure for each quarter is accrued, and the algorithm tests against maintenance limits.

The algorithm then determines 268 if maintenance is required. If maintenance is required, the algorithm creates 270 a calendar event indicative of the new maintenance event, and resets the time since the last maintenance event has occurred. If maintenance is not required, the algorithm increments 272 the calendar by one quarter, and repeats 274 the analysis for each turbine 14. The algorithm then automatically simulates 264 turbine operation based on received inputs for each subsequent gas turbine 14 as described previously herein. This process is repeated until all subsequent gas turbine information has been entered and analyzed by the algorithm. At this time the client or business entity may make manual adjustments to the calculated schedule to account for operational restraints such as quarters where no maintenance can occur. The manually adjusted schedule is then used in step 276.

The business entity then calculates 276 the parts flow through the turbine fleet by activating remote server 120 such as, by depressing a "calculate parts flow" icon, for example. The algorithm then notifies 278 the client if all inputs have not been entered 280. In one embodiment, if all required inputs have not been entered, the algorithm prints an error message and the algorithm ceases execution. In another embodiment, if all the inputs have been entered, the algorithm prompts 282 the business entity to load initial parts ages and load the initial parts inventory. The client can then enter the missing data and press the "calculate parts flow" icon again. For example, the algorithm prompts the client to enter the current age of a plurality of parts currently installed on gas turbine 14, and additionally, the inventory of spare parts currently maintained by the client.

The algorithm then determines 284 whether the spare parts requested by the client have been satisfied, that is, does the business entity have all spare parts required to perform the outage on hand in the clients inventory, or is the business entity required to supply additional parts for the outage which are currently not in the client's warehouse. If adequate spare parts are not in the client's inventory, the algorithm automatically orders 286 new parts from the business entity. Concurrently, the algorithm determines 288 whether an outage event has been previously scheduled for each quarter. If an outage event has not been scheduled 290 for the current quarter, the algorithm proceeds 292 to the next quarter. If an outage event has been scheduled 290 for the current quarter, a plurality of parts and their respective ages are input 294 into the algorithm and the number is incremented by 1.

The algorithm then determines 296 if the parts life has expired, i.e. the part is sufficiently worn to be replaced during the event. In one embodiment, if the part has not reached the end of its service life, the algorithm determines 298 whether the part should be repaired or not repaired, i.e. remain in the turbine until the next event. In another embodiment, if the part has reached the end of its service life, the algorithm determines 300 whether the part is currently in the client's inventory. If the part is not available in the client's inventory, the new part is ordered 302 from the business entity and the client is charged for the new part or repair of the existing part. If the part is available in the client's inventory, the new part is removed 304 from the client's inventory, and the client is charged only for the repair/replacement of the new part. The algorithm then determines 306 if the spare parts required to perform the event have been satisfied based on the part's inventory. If all parts requirements are satisfied 306 for the event, the algorithm processes 308, alternatively, the algorithm orders 310 new parts from the business entity, and the algorithm automatically charges the client for the new part. This process is repeated 312 until all turbine repair parts required to repair the turbine during the event have been analyzed.

The business entity then enters 314 the escalation and present value rates for each part used by the client during the event, and the algorithm automatically computes 316 the escalated pricing of the repair/replacement parts, the present value 318 of the repair/replacement parts, and generates 320 a financial report indicative of turbine maintenance for the client.

The methods and apparatus described herein facilitate approximating turbine operating condition and turbine life cycle based on hours of operation on the parts, therefore providing a simplified method of approximating parts life and thus maintenance events.

While the invention has been described in terms of various specific embodiments, those skilled in the art will recognize that the invention can be practiced with modification within the spirit and scope of the claims.

What is claimed is:

1. A network based system for maintaining at least one component, said system comprising:
   a client system;
   a centralized database for storing information;
   a server system configured to be coupled to said client system and said database, said server system further configured to:
   receive, at the database, component operational history data and component inspection data from a user for a pre-identified component;
   receive, at the database, a customer expectation of contingency fees and service prices from a user;
   receive, at the database, costs comprising at least one of component replacement part costs, component part repair costs, and vendor service costs, the costs are associated with the pre-identified component and are determined using pre-stored costs related to the pre-identified component;
   prompt a user to input a pre-determined component operational forecast into the database;
   receive, from the user, a number of inspection intervals for component parts, and based on the number of inspection intervals for each component part, adjust a quantity of input entries for repair work for each component part;
   determine whether the user input all information necessary to generate a financial report;
   present an error message to the user and halt execution if it is determined that not all information necessary to generate a financial report was input;
   analyze component maintenance information including component inspection data and at least one of component operational history data, customer expectation of contingency fees and service prices, replacement part costs, part repair costs, vendor service costs, and component operational forecast; and
   automatically generate a financial report including at least one schedule of component maintenance events and costs associated with each event based on the component maintenance information analysis.

2. A network based system in accordance with claim 1 wherein said server system is configured to receive component replacement part costs, component part repair costs, and vendor service costs associated with the identified component from an on-line catalog selected based on the component identification, the online catalog comprising pre-stored data for a plurality of pre-identified components.

3. A network based system in accordance with claim 1 wherein said server system is configured to:
   determine component maintenance event contingency fees;
   determine a customer cost discount level for replacement parts and vendor fees.

4. A network based system in accordance with claim 1 wherein said server system is configured to compute a schedule for maintenance events based on at least one of estimated life of replacement parts, estimated life of repaired parts, component operational history, component operational forecast and a predetermined maintenance event interval.

5. A network based system in accordance with claim 4 wherein said server system is configured to determine a part repair cycle.

6. A network based system in accordance with claim 1 wherein said server system is configured to:

prompt a user to input an age of a plurality of parts installed in the component;

prompt a user to input an age of the component parts in inventory;

determine, from the schedule of maintenance events, the age of each of the plurality of installed parts and the age of each of the plurality of inventory parts at each maintenance event; and display an identification of each part whose age at each scheduled maintenance event exceeds a predetermined age.

7. A network based system in accordance with claim 6 wherein the identification of the component includes a frame size and a combustion type, said server system is configured to:

access a predetermined on-line catalog using the frame size and combustion type, the catalog including new parts costs, parts repair costs, and part expected life; and recommend an inspection interval and an estimate of remaining parts life based on an inputted gas component frame size and combustion type.

8. A network based system in accordance with claim 1 wherein the component is one of a plurality of components in a fleet of components, said server system is configured to:

automatically compute a projected rotation of component parts through a fleet of components;

remove selected parts from an inventory;

repair the component using the selected parts;

automatically orders replacement parts for purchase; and replenish the inventory using the replacement parts.

9. A network based system in accordance with claim 1 wherein said server system is configured to automatically compute the financial charges accrued during the maintenance event using the component replacement part costs, the component part repair costs, and the vendor service costs associated with the maintenance event.

10. A computer program embodied on a non-transitory computer readable medium for maintaining at least one component, said program comprising a code segment that receives, at a database, component operational history data and component inspection data from a user for a pre-identified component and then:

receives, at the database, a customer expectation of contingency fees and service prices from a user;

receives, at the database, costs comprising at least one of component replacement part costs, component part repair costs, and vendor service costs, the costs are associated with the pre-identified component and are determined using pre-stored costs related to the pre-identified component;

prompts a user to input a pre-determined component operational forecast into the database;

receives, from the user, a number of inspection intervals for component parts, and based on the number of inspection intervals for each component part, adjust a quantity of input entries for repair work for each component part;

determines whether the user has input all necessary information in order to generate a financial report;

presents an error message to the user and halts execution if it is determined that not all necessary information to generate a financial report was input;

analyzes component maintenance information including component inspection data and at least one of component operational history data, customer expectation of contingency fees and service prices, replacement part costs, part repair costs, vendor service costs, and component operational forecast; and automatically generates a financial report including at least one schedule of component maintenance events and costs associated with each event based on the component maintenance information analysis.

11. A computer program in accordance with claim 10, said program comprising a code segment that receives component replacement part costs, component part repair costs, and vendor service costs associated with the identified component from an on-line catalog selected based on the component identification, the online catalog comprising pre-stored data for a plurality of pre-identified components.

12. A computer program in accordance with claim 10, said program comprising a code segment that:

determines component maintenance event contingency fees;

determines a customer cost discount level for replacement parts and vendor fees.

13. A computer program in accordance with claim 10, said program comprising a code segment that computes a schedule for maintenance events based on at least one of estimated life of replacement parts, estimated life of repaired parts, component operational history, component operational forecast and a predetermined maintenance event interval.

14. A computer program in accordance with claim 13, said program comprising a code segment that determines a part repair cycle.

15. A computer program in accordance with claim 10, said program comprising a code segment that:

prompts a user to input an age of a plurality of parts installed in the component;

prompts a user to input an age of the component parts in inventory;

determines, from the schedule of maintenance events, the age of each of the plurality of installed parts and the age of each of the plurality of inventory parts at each maintenance event; and displays an identification of each part whose age at each scheduled maintenance event exceeds a predetermined age.

16. A computer program in accordance with claim 15, said program comprising a code segment that:

accesses a predetermined on-line catalog using the component frame size and combustion type, the catalog including new parts costs, parts repair costs, and part expected life; and recommends an inspection interval and an estimate of remaining parts life based on an inputted gas component frame size and combustion type.

17. A computer program in accordance with claim 10 wherein the component is one of a plurality of components in a fleet of components, said program comprising a code segment that:

automatically computes a projected rotation of component parts through a fleet of components;

removes selected parts from an inventory;

repairs the component using the selected parts;

automatically orders replacement parts for purchase; and replenishes the inventory using the replacement parts.

18. A computer program in accordance with claim 10 wherein said server system is configured to automatically compute the financial charges accrued during the maintenance event using the component replacement part costs, the component part repair costs, and the vendor service costs associated with the maintenance event.

* * * * *